United States Patent
Nakaide et al.

(10) Patent No.: US 11,956,355 B2
(45) Date of Patent: Apr. 9, 2024

(54) CONTROL DEVICE, INDUSTRIAL CONTROL SYSTEM, AND ENCRYPTION KEY LIFE EXTENSION METHOD

(71) Applicant: Mitsubishi Power, Ltd., Yokohama (JP)

(72) Inventors: Minoru Nakaide, Tokyo (JP); Shinichi Toda, Yokohama (JP); Yoshikane Yamanaka, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 464 days.

(21) Appl. No.: 17/289,042

(22) PCT Filed: Oct. 16, 2019

(86) PCT No.: PCT/JP2019/040624
§ 371 (c)(1),
(2) Date: Apr. 27, 2021

(87) PCT Pub. No.: WO2020/166132
PCT Pub. Date: Aug. 20, 2020

(65) Prior Publication Data
US 2021/0409212 A1    Dec. 30, 2021

(30) Foreign Application Priority Data
Feb. 15, 2019   (JP) ................................. 2019-025256

(51) Int. Cl.
*H04L 9/08*    (2006.01)

(52) U.S. Cl.
CPC ............ *H04L 9/0894* (2013.01); *H04L 9/083* (2013.01); *H04L 9/0891* (2013.01)

(58) Field of Classification Search
None
See application file for complete search history.

(56) References Cited

U.S. PATENT DOCUMENTS 6,721,784 B1 * 4/2004 Leonard .................. H04L 51/18
                                                 709/204
6,940,979 B1 * 9/2005 Bobbitt .................... H04L 9/006
                                                 713/175
(Continued)

FOREIGN PATENT DOCUMENTS

JP    2003-284024    10/2003
JP    2004-171524    6/2004
(Continued)

OTHER PUBLICATIONS

International Search Report dated Jan. 21, 2020 in International (PCT) Application No. PCT/JP2019/040624.

*Primary Examiner* — Kambiz Zand
*Assistant Examiner* — Mahabub S Ahmed
(74) *Attorney, Agent, or Firm* — Wenderoth, Lind & Ponack, L.L.P.

(57) ABSTRACT

The control device is configured to communicate with another device via a communication network, and comprises: a key acquisition unit configured to acquire, from a key distribution server via the communication network, an encryption key with a life period for performing encrypted communication with the another device; an encrypted communication processing unit configured to perform the encrypted communication with the another device using the encryption key within the life period; a server state detection unit configured to detect a key acquisition disabled state where acquisition of the encryption key by the key acquisition unit is disabled; and a life extension unit configured to perform extension processing for extending the life period if the key acquisition disabled state is detected.

10 Claims, 6 Drawing Sheets

(56) References Cited

U.S. PATENT DOCUMENTS

| | | | | |
|---|---|---|---|---|
| 7,209,563 B1* | 4/2007 | Calvez | | H04L 9/0836 380/278 |
| 8,291,224 B2* | 10/2012 | Pelton | | H04L 63/06 713/175 |
| 9,251,334 B1* | 2/2016 | Molitor | | H04L 9/3271 |
| 9,306,751 B2* | 4/2016 | Wilson | | G09C 1/00 |
| 9,552,485 B1* | 1/2017 | Cignetti | | H04L 9/3263 |
| 10,003,584 B1* | 6/2018 | Roth | | H04L 63/068 |
| 10,110,382 B1* | 10/2018 | Roth | | H04L 9/0894 |
| 10,320,757 B1* | 6/2019 | Secker-Walker | | H04L 63/0876 |
| 10,673,628 B1* | 6/2020 | Shtop | | H04L 9/32 |
| 11,853,446 B2* | 12/2023 | Argenti | | H04L 9/3247 |
| 2003/0140241 A1 | 7/2003 | England et al. | | |
| 2004/0138910 A1 | 7/2004 | Matsuno et al. | | |
| 2004/0148505 A1* | 7/2004 | Qiu | | G06F 21/33 713/175 |
| 2005/0131998 A1* | 6/2005 | Takashima | | G11B 20/0021 711/163 |
| 2005/0201557 A1* | 9/2005 | Ishidoshiro | | H04L 63/0492 380/44 |
| 2006/0053112 A1* | 3/2006 | Chitkara | | G06F 16/284 707/999.009 |
| 2006/0291664 A1* | 12/2006 | Suarez | | H04L 9/3263 380/286 |
| 2008/0016337 A1* | 1/2008 | Morgan | | H04L 63/062 713/158 |
| 2008/0247551 A1* | 10/2008 | Iwamoto | | H04N 1/32133 380/278 |
| 2009/0013183 A1* | 1/2009 | Sato | | G06F 21/10 713/169 |
| 2009/0092252 A1* | 4/2009 | Noll | | H04L 9/083 380/277 |
| 2009/0245519 A1* | 10/2009 | Cachin | | H04L 9/0891 713/193 |
| 2010/0027787 A1* | 2/2010 | Benkert | | H04N 21/26606 380/45 |
| 2010/0115267 A1* | 5/2010 | Guo | | H04L 9/3268 713/156 |
| 2011/0113239 A1* | 5/2011 | Fu | | H04L 9/0823 713/156 |
| 2012/0272308 A1 | 10/2012 | Mishina et al. | | |
| 2014/0059642 A1* | 2/2014 | Deasy | | H04W 12/00 726/1 |
| 2014/0122882 A1* | 5/2014 | Leppanen | | H04L 9/3242 713/170 |
| 2015/0186657 A1* | 7/2015 | Nakhjiri | | H04L 9/0836 713/193 |
| 2016/0105283 A1* | 4/2016 | Mityagin | | H04L 9/12 380/279 |
| 2016/0173287 A1* | 6/2016 | Bowen | | H04L 9/3268 713/156 |
| 2019/0372758 A1* | 12/2019 | Tevosyan | | H04L 9/0891 |
| 2021/0050996 A1* | 2/2021 | Fries | | H04L 9/0894 |

FOREIGN PATENT DOCUMENTS

| | | |
|---|---|---|
| JP | 2004-171525 | 6/2004 |
| JP | 2010-524410 | 7/2010 |
| JP | 2011-221846 | 11/2011 |
| JP | 2012-226680 | 11/2012 |
| WO | 2008/128212 | 10/2008 |

* cited by examiner

CONTROL DEVICE, INDUSTRIAL CONTROL SYSTEM, AND ENCRYPTION KEY LIFE EXTENSION METHOD

TECHNICAL FIELD

The present disclosure relates to a control system, and particularly relates to improvement of security of a distributed control device.

BACKGROUND

In recent years, industrial control systems (ICS) which support infrastructure such as petroleum, gas, electric power, and manufacturing are connected to external networks, and security measures against cyberattacks are becoming more important. As a device for controlling a plant such as a power plant or a manufacturing plant, which is a kind of the industrial control system, a distributed control device (distributed control system, DCS) which controls the plant with a plurality of control devices communicating with each other is known. The DCS is connected to a plurality of field devices installed in the plant via a control network, which controls and monitors these devices (see Patent Documents 1 and 2). Further, the control devices constituting the distributed control device are connected to a human machine interface (HMI) for operating and monitoring the plant via a control information network constructed by, for example, the Ethernet, which was registered trademark of Xerox Corporation, to perform control of each field device based on an instruction transmitted from a computer such as the HMI outside the device. As a cyber attack on the industrial control system including such a DCS, for example, a denial of service (DoS) attack or an attack method widely used in an information system such as spoofing, eavesdropping, and tampering may be performed.

On the Internet, the confidentiality of communication is ensured by encrypting communication data. For example, in SSL communication, a session key (common key) valid for a certain period (having a certain life) is exchanged by a key exchange protocol such as Internet Key Exchange (IKE) at the start of communication to perform encrypted communication of communication data using the session key. Further, a key distribution center (KDC) is installed, and each user's device acquires a session key from the key distribution center and uses it for encrypted communication between the devices. Patent Document 3 discloses a service providing device that extends the expiration date of a ticket certifying user authentication, authority or the like in response to a request.

CITATION LIST

Patent Literature

Patent Document 1: JP2011-221846A
Patent Document 2: JP2012-226680A
Patent Document 3: JP2004-171524A

SUMMARY

Problems to be Solved

When installing a server (key distribution server) that distributes a session key used for encrypted communication in an industrial control system, if the key distribution server is down due to a hardware failure or a malicious cyber attack such as a DoS attack, communication between control devices constituting the distributed control device becomes impossible at the time when the life of the session key expires. As a result, process data monitoring and operation from the HMI and communication between the control devices become impossible when the life of the session key expires, and an interlock that causes emergency shutdown of the control target reduces the availability of the control target.

As a countermeasure, for example, it is conceivable to make the key distribution server redundant by duplicating it, but if all the key distribution servers go down, there remains a risk that the availability of the controlled target is reduced as described above. As an alternative countermeasure, it is also conceivable to use an encryption key with no life limit, but there remains a risk that encrypted data is decrypted.

In view of the above, an object of at least one embodiment of the present invention is to provide a distributed control device with improved security performance and reliability.

Solution to the Problems (1) A control device according to at least one embodiment of the present invention is configured to communicate with another device via a communication network, and comprises: a key acquisition unit configured to acquire, from a key distribution server via the communication network, an encryption key with a life period for performing encrypted communication with the another device; an encrypted communication processing unit configured to perform the encrypted communication with the another device using the encryption key within the life period; a server state detection unit configured to detect a key acquisition disabled state where acquisition of the encryption key by the key acquisition unit is disabled; and a life extension unit configured to perform extension processing for extending the life period if the key acquisition disabled state is detected.

With the above configuration (1), using the encryption key acquired from the key distribution server which distributes the encryption key such as a session key, the control device communicates with another device such as a device together constituting a distributed control device, a HMI device (described later), or an ACS (described later). Further, in a state where the life period of the encryption key cannot be extended since the key distribution server is down due to a hardware failure or a cyber attack (key acquisition disabled state), the control device automatically extends the life of the encryption key used at this time without communicating with the key distribution server.

This makes it possible to prevent data communication between control devices constituting the distributed control device from becoming impossible due to the expiration of the life of the encryption key. As a result, it is possible to prevent the control target from being uncontrollable by the distributed control device, and it is possible to prevent the availability of the control target from decreasing. Similarly, it is possible to prevent data communication with other devices such as a HMI device from becoming impossible, and it is possible to prevent a situation in which the plant is stopped since the industrial control system cannot be monitored and operated via the control device. In addition, since communication between control devices constituting the distributed control device is encrypted using the encryption key having a life limit, the distributed control device can be protected from cyberattacks such as eavesdropping, tampering, and spoofing.

(2) In some embodiments, in the above configuration (1), the control device further comprises a life monitoring unit configured to determine expiration of the life period. The life extension unit prevents the life monitoring unit from determining expiration of the life period as the extension processing.

With the above configuration (2), it is possible to appropriately extend the life period of the encryption key.

(3) In some embodiments, in the above configuration (2), the life monitoring unit is configured to count the life period, and the extension processing puts back a count value of the life monitoring unit by a predetermined value.

With the above configuration (3), the extension processing of the life period of the encryption key puts back the count value of the life period by the predetermined value. Thus, it is possible to appropriately extend the life period of the encryption key.

(4) In some embodiments, in any one of the above configurations (1) to (3), the server state detection unit detects the key acquisition disabled state, based on state notification periodically transmitted from the key distribution server or communication status of the state notification.

With the above configuration (4), the key distribution server periodically notifies the control device of the state of the server, and the control device determines whether the encryption key can be acquired (updated) from the key distribution server, based on state information of the key distribution server notified from the key distribution server or communication status of the state notification periodically performed. Thus, it is possible to appropriately detect the key acquisition disabled state.

(5) In some embodiments, in any one of the above configurations (1) to (4), the control device is a device constituting a distributed control device, and the control device further comprises: a storage unit configured to store the encryption key and the life period acquired by the key acquisition unit; a key request receiving unit configured to receive a key request message requesting the encryption key and transmitted from a joining control device that intends to newly join the distributed control device; and a key notification unit configured to transmit the encryption key and the life period stored in the storage unit to the joining control device that has transmitted the key request message.

With the above configuration (5), the control device notifies the encryption key instead of the key distribution server in response to the request from the other control device (joining control device) that intends to newly join the distributed control device to which the control device belongs. Thus, even in the key acquisition disabled state due to the key distribution server going down for example, the joining control device can join the distributed control device.

(6) In some embodiments, in the above configuration (5), the key notification unit transmits the encryption key and the life period to the joining control device if a specified condition including that the key acquisition disabled state is detected by the server state detection unit is satisfied.

With the above configuration (6), the control device transmits the encryption key to the joining control device if the control device detects the key acquisition disabled state. This prevents the control device from transmitting the encryption key, etc., to the joining control device even though the key distribution server can distribute the encryption key.

(7) In some embodiments, in the above configuration (1) to (6), the encryption key is a session key.

With the above configuration (7), the encryption key valid only for the life period is a session key in a common key cryptosystem valid within the life period. With the session key, the same effect is achieved as in the above (1) to (6).

(8) An industrial control system according at least one embodiment of the present invention comprises: the control device described in any one of the above (1) to (7); and a key distribution server configured to distribute an encryption key with a life period shared between the control device and another device to the control device and the another device.

With the above configuration (8), the same effect is achieved as in the above (1).

(9) In some embodiments, in the above configuration (8), the key distribution server is redundant.

With the above configuration (9), it is possible to improve the reliability of the key distribution server. Further, when at least one device constituting the key distribution server operates appropriately, the control device (joining control device) that intends to newly join the distributed control device can join.

(10) An encryption key life extension method according to at least one embodiment of the present invention is performed by a control device configured to communication with another device via a communication network, and comprises: a key acquisition step of acquiring, from a key distribution server via the communication network, an encryption key with a life period for performing encrypted communication with the another device; an encrypted communication step of performing the encrypted communication with the another device using the encryption key within the life period; a server state detection step of detecting a key acquisition disabled state where acquisition of the encryption key by the key acquisition step is disabled; and a life extension step of performing extension processing for extending the life period if the key acquisition disabled state is detected.

With the above configuration (10), the same effect is achieved as in the above (1).

Advantageous Effects

At least one embodiment of the present invention provides a distributed control device with improved security performance and reliability.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
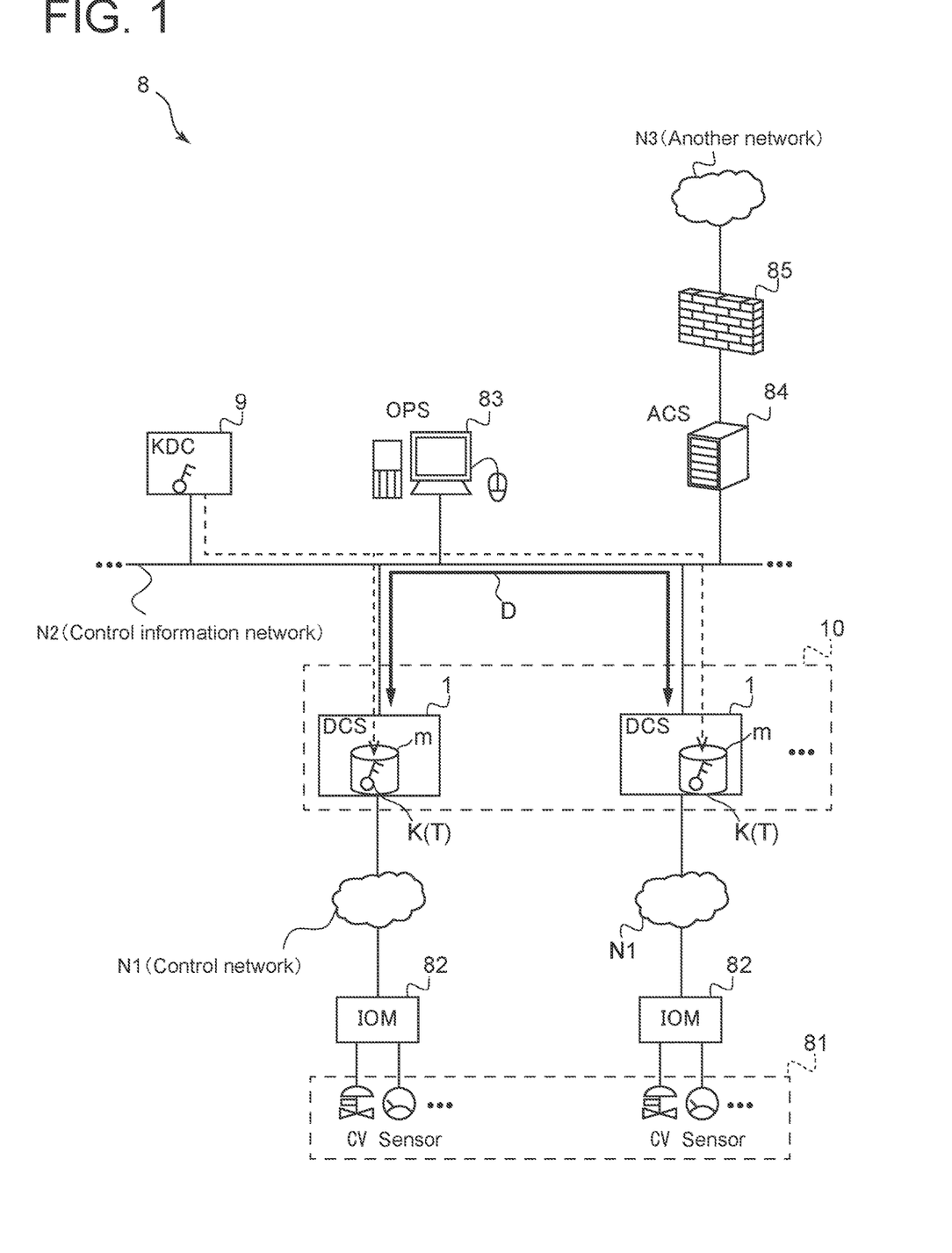
FIG. 1 is a schematic configuration diagram of an industrial control system (ICS) according to an embodiment of the present invention.

FIG. 1 is a schematic configuration diagram of an industrial control system 8 (ICS) according to an embodiment of the present invention.

The industrial control system 8 is a system for monitoring and controlling social infrastructure such as electric power, gas, and water, or a plant such as a power generation plant and a chemical plant. The industrial control system 8 shown in FIG. 1 is a control system for monitoring and controlling a plant such as a power generation plant, and includes a distributed control device 10 composed of a plurality of control devices 1 which execute automatic control of the plant and input/output processing with the site while communicating with each other. In the following, the case where the control device 1 is a device constituting the distributed control device 10 will be described as an example. However, the present invention is not limited thereto. In some embodiments, the control device 1 may not be a device constituting the distributed control device 10.

More specifically, as shown in FIG. 1, each control device 1 is connected to an input/output module (IOM 82) connected to a plurality of field devices 81 installed in the plant via a control network N1. Instead of the IOM 82, each control device 1 may be connected to (programmable logic controller (PLC) which controls the field devices 81. The field devices 81 are final control elements including various sensors for measuring temperature, flow rate, or pressure, and valves (control valve, etc.). The control network N1 is a communication network N connecting such field devices 81 and the control devices 1. Further, each control device 1 collects plant data such as measurement data and event data obtained from the sensor, executes various calculations using the collected plant data, and transmits the calculation result to the IOM 82, for example, to perform automatic control of the plant.

Further, as shown in FIG. 1, each control device 1 is connected to a control information network N2 constructed by, for example, the Ethernet, which was registered trademark of Xerox Corporation. The control information network N2 is a communication network N such as an IP network connecting the control device 1 and a computing device for controlling, monitoring, and managing the plant, and is connected to another network N3 such as a corporate LAN or the Internet (external network) via a firewall device 85. For example, the control information network N2 is connected to an operator station (OPS 83), which is a human machine interface (HMI) for operating and monitoring the plant, and to an ACS 84 (accessory station) for storing and managing a large amount of plant data. When the control device 1 receives an instruction transmitted from the OPS 83 or a remote OPS (not shown) connected to the Internet and communicated via the control information network N2, the control device 1 executes or responds to the instruction, for instance.

The industrial control system 8 as described above is configured to perform encrypted communication between the control devices 1. To this end, the industrial control system 8 further includes a key distribution server 9, as shown in FIG. 1. In the embodiment shown in FIG. 1, the key distribution server 9 has a function of distributing an encryption key K (common key) shared between the control devices 1 constituting the distributed control device 10 to each of the control devices 1. The key distribution server 9 may be a key distribution center (KDC) commonly known. As shown in FIG. 1, each control device 1 receives the encryption key K distributed from the key distribution server 9. Thereby, each control device 1 can transmit communication data D to the other control device 1 in an encrypted manner using the encryption key K and decrypt the encrypted communication data D received from the other control device 1 using the encryption key K to perform encryption key between the control devices 1.

Each control device 1 may perform encrypted communication with at least one other device such as the above-described other control device 1 connected to the communication network N, the OPS 83, and the ACS 84, and the key distribution server 9 may distribute the encryption key K used between these devices. In this case, for example, the encryption key K used between the control device 1 and the OPS 83 and the encryption key K used between the control device 1 and the ACS 84 may be the same or different.

The encryption key K has a life period T set by the key distribution server 9. For example, the encryption key K may be a session key commonly known for common key cryptosystem which is valid for a certain period (life period T). Since the encryption key K has the life period T, each control device 1 cannot perform encrypted communication with the other control device 1 using the encryption key K after the expiration of the life period T. Therefore, each control device 1 acquires a new encryption key K from the key distribution server 9 before the expiration of the life period T of the encryption key K that has been distributed from the key distribution server 9. By updating the encryption key K to a new one as needed, it is possible to perform communication (encrypted communication) between the control devices 1 and others for a long period of time longer than the individual life period T of each encryption key K, while reducing the risk of unauthorized decryption of the encrypted communication.

In the industrial control system 8 as described above, if the control device 1 cannot acquire the encryption key K from the key distribution server 9 for some reason, for example, since the key distribution server 9 is down due to a hardware failure or a malicious cyberattack such as a DoS attack (hereinafter referred to as key acquisition disabled state), communication between the control devices 1 becomes impossible when the life period T of the encryption key K expires. As a result, when an interlock that causes emergency shutdown of the control target such as a gas turbine or a boiler of a thermal power plant acts via the field device 81, the availability of the control target is reduced. To solve this problem, the control device 1 is configured to, if the key acquisition disabled state is detected, automatically extend the life period T of the latest encryption key K used by the device.

Figure 2:
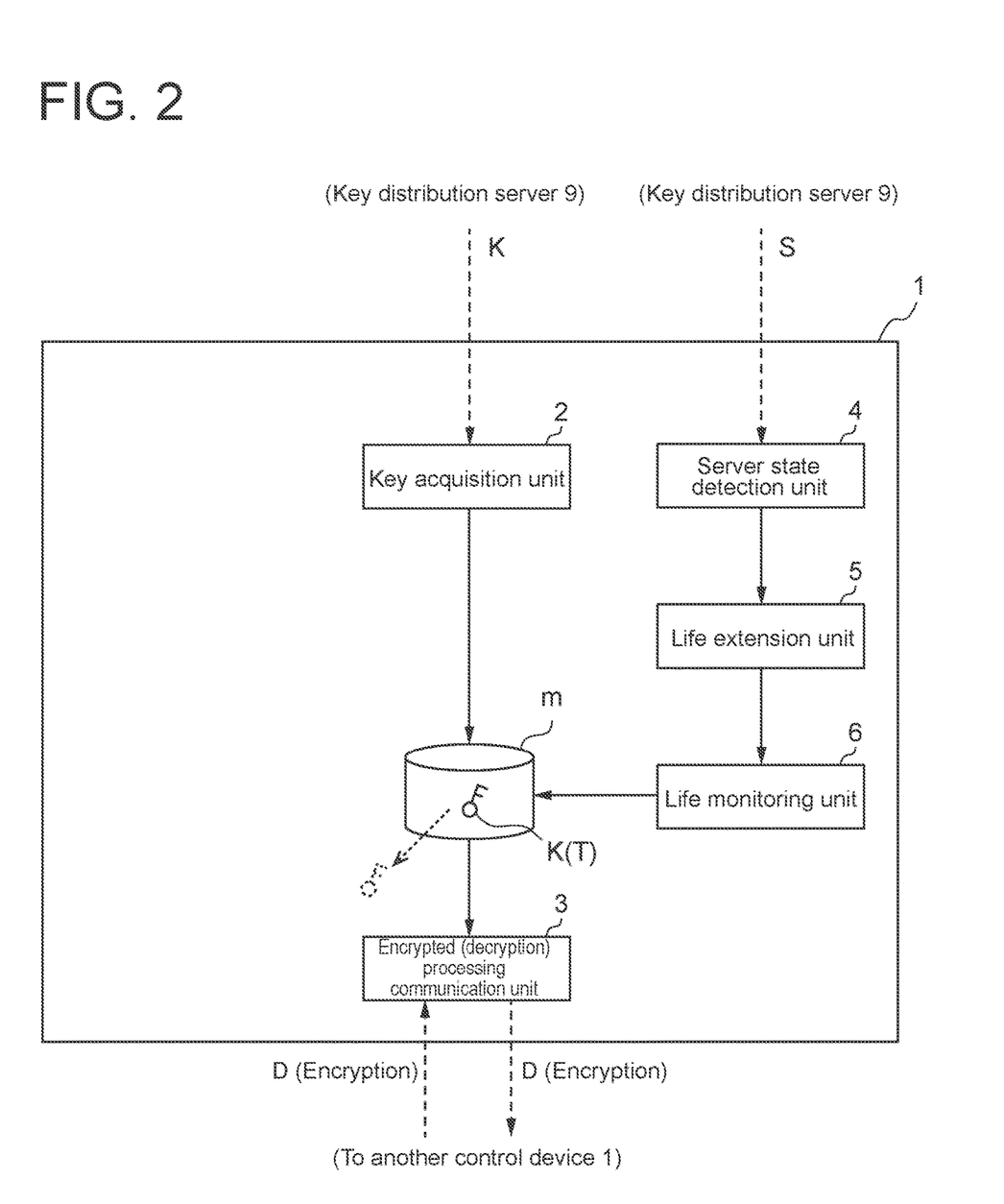
FIG. 2 is a schematic configuration block diagram of a control device of a distributed control device according to an embodiment of the present invention.

The control device 1 configured to automatically extend the life period T of the encryption key K will now be described in detail with reference to FIGS. 2 to 5. FIG. 2 is a schematic configuration block diagram of the control device 1 of the distributed control device 10 according to an embodiment of the present invention. In the following, the present invention will be described with reference to the case where the encrypted communication is performed between the control devices 1.

The control device 1 is a device constituting the distributed control device 10 in which a plurality of control devices 1 are connected via the communication network N, and exchanges communication data D with another control device 1 or at least a part of the control devices 1 excluding itself through encrypted communication using the encryption key K distributed (acquired) from the key distribution server 9. As shown in FIG. 2 (the same applies to FIG. 4 described later), the control device 1 includes a key acquisition unit 2, an encrypted communication processing unit 3, a server state detection unit 4, and a life extension unit 5.

Each functional unit of the control device 1 will be described in conjunction with an example where the encryption key K is a session key and the key distribution server 9 is a KDC server.

The control device 1 may comprise, for example, a computer. Specifically, the control device includes a CPU (processor, not shown), and a storage device m such as a memory, e.g., ROM and RAM, and an external storage device. The CPU operates (e.g., computation of data) in accordance with program instructions (control program) loaded to a main storage device, and thereby the functional units of the control device 1 are implemented. The encryption key K with the life period T distributed from the key distribution server 9 is stored in the storage unit m together with the life period T. The key distribution server 9 may also comprise a computer.

The key acquisition unit 2 is a functional unit configured to acquire the session key K with the life period T from the key distribution server 9 via the communication network N. More specifically, the key acquisition unit 2 is configured to periodically acquire the session key K from the key distribution server 9. For example, the key acquisition unit 2 may acquire the session key K by executing a predetermined encryption key exchange protocol such as IKE (Internet Key Exchange) defined by RFC 2409 with the key distribution server 9. In the embodiment shown in FIGS. 1 and 2, the communication network N is the control information network N2 described above.

The encrypted communication processing unit 3 is a functional unit configured to perform encrypted communication with another control device 1 by using the session key K within the life period T. Specifically, when each control device 1 transmits the communication data D to the other control device 1, the encrypted communication processing unit 3 encrypts the communication data D using the session key K to transmit the communication data D. On the other hand, when each control device 1 receives the encrypted communication data D from the other control device 1, the encrypted communication processing unit 3 decrypts the communication data D using the same session key K as used for the encryption to obtain the communication data D.

The server state detection unit 4 is a functional unit configured to detect the key acquisition disabled state where the session key K cannot be acquired from the key distribution server 9 by the key acquisition unit 2. Specifically, the key acquisition disabled state may be detected based on the content of state notification S (described later) transmitted from the key distribution server 9, or the key acquisition disabled state may be detected based on reception status of the response to the transmitted ping or the like. Alternatively, the key acquisition disabled state may be determined if the key acquisition unit 2 fails to acquire the new encryption key K as a result of one or more retries before the expiration of the life period T. The state notification S will be described below in detail.

The life extension unit 5 is a functional unit configured to perform extension processing for extending the life period T if the key acquisition disabled state is detected by the server state detection unit 4. If the key acquisition disabled state is detected by the server state detection unit 4, a key exchange protocol cannot be executed with the key distribution server 9. Therefore, the life extension unit 5 performs the following processing as the extension processing without communicating with the key distribution server 9. This extension processing extends the life period T of the latest available session key that has already been acquired, thus making it possible to avoid the situation that communication with another control device 1 cannot be performed due to the expiration of the life period T.

With the above configuration, using the encryption key K acquired from the key distribution server 9 which distributes the encryption key K such as a session key K, the control device 1 constituting the distributed control device 10 communicates with another device 1 also constituting the distributed control device 10. Further, in a state where the life period T of the encryption key K cannot be extended since the key distribution server 9 is down due to a hardware failure or a cyber attack (key acquisition disabled state), the control device 1 automatically extends the life of the encryption key K used at this time without communicating with the key distribution server 9.

This makes it possible to prevent data communication between control devices 1 constituting the distributed control device 10 from becoming impossible due to the expiration of the life of the encryption key K. As a result, it is possible to prevent the control target from being uncontrollable by the distributed control device 10 via the field device 81, and it is possible to prevent the availability of the control target from decreasing. In addition, since communication between control devices 1 constituting the distributed control device 10 is encrypted using the encryption key K having a life limit, the distributed control device 10 can be protected from cyberattacks such as eavesdropping, tampering, and spoofing.

Next, the extension processing by the life extension unit 5 will be described specifically.

In some embodiments, as shown in FIG. 2, the control device 1 further includes a life monitoring unit 6 configured to determine expiration of the life period T. Further, the life extension unit 5 prevents the life monitoring unit 6 from determining expiration of the life period T as the extension processing. Thus, it is possible to appropriately extend the life period T of the encryption key K.

Specifically, in some embodiments, the life monitoring unit 6 may count the life period T with a counter, for example. When the life monitoring unit 6 has counted the number corresponding to the life period T by counting up or down, it determines that the life period T has expired.

In this case, in some embodiments, the extension processing to prevent the life monitoring unit 6 from determining the expiration of the life period T may be to put back the count value of the life monitoring unit 6 by a predetermined value. In other words, the life extension unit 5 may put back the count value of the life monitoring unit 6 by a predetermined value as the extension processing. Specifically, when the life monitoring unit 6 counts the life period T by counting up the current value (count value) of the counter may be subtracted by the predetermined value. When the life monitoring unit 6 counts the life period T by counting down, the current value of the counter may be added by the predetermined value. The predetermined value may be fixed in advance, or be a value corresponding to a count value at the time when the extension processing is executed, for example, half of the count value. Alternatively, the predetermined value may be a count value at the time when the extension processing is executed, and the extension processing may be executed by resetting the counter value.

Thus, the life monitoring unit 6 does not determine the expiration of the life period T even if the period specified by the life period T, for example set in the key distribution server 9 when the session key K is distributed, expires. However, the present invention is not limited to this embodiment. In some embodiments, the life extension unit 5 may perform the extension processing by stopping the counting of the life monitoring unit 6. Alternatively, in some embodiments, the life extension unit 5 may increase the total number of counters (time) to be counted as the life period T.

Further, the life extension unit 5 may perform the extension processing once or multiple times until the key acquisition disabled state is resolved and the key exchange protocol can be appropriately performed with the key distribution server 9, for example. Specifically, the count value may be compared with a predetermined threshold, and if the count value coincides with the threshold, the extension processing may be performed. As a result, the life period T can be extended to, for example, a recoverable period in which the downed key distribution server 9 can be recovered.

With the above configuration, the life period T of the encryption key K can be extended by putting back the count value of the life period T by the predetermined value. Thus, it is possible to appropriately extend the life period T of the encryption key K.

In some embodiments, the life extension unit 5 may perform the extension processing by rewriting the life period T stored in a predetermined storage area of the storage unit m provided in the control device 1. In this case, when the life period T stored in the storage unit m is rewritten, the life monitoring unit 6 may reload the storage area to monitor the life period T updated by the extension processing. At this time, the life period T after the extension processing may be longer than the life period T before the extension processing. The life period T after the extension processing may be a sufficiently long time for the key acquisition disabled state to be resolved; for example, it may be a recoverable period in which the downed key distribution server 9 can be recovered.

Next, the method of detecting the key acquisition disabled state by the server state detection unit 4 will be described specifically.

In some embodiments, the server state detection unit 4 may detect (determine) the key acquisition disabled state, based on state notification S periodically transmitted from the key distribution server 9 or communication status of the state notification S. In the state notification S, the key distribution server 9 voluntarily notifies the control device 1 of a state such as normality or abnormality of the server via the communication network N. In the case of abnormality, the state notification S may include the content of the abnormality (for example, a hardware failure, an internal abnormality, etc.). Further, the state notification S may be transmitted by multicast to a plurality of control devices 1 which are destinations of predetermined IP addresses, for example. However, the present invention is not limited to the present embodiment. In some embodiments, the state notification S may be transmitted by broadcast.

Further, the control device 1 may determine whether it is in the key acquisition disabled state, based on the content of the state notification S periodically transmitted from the key distribution server 9. For example, the reception status of the response to the transmission of ping may not make it possible to appropriately determine whether the key distribution function of the key distribution server 9 is normal or abnormal, but the determination based on the content of the state notification S makes it possible more appropriate determination. Further, the control device 1 may determine whether it is in the key acquisition disabled state according to the communication status of the state notification S, for instance, by determining that it is in the key acquisition disabled state when the state notification S, which should be periodically performed, cannot be received a certain number of times, specifically, once or more. At this time, since there is a possibility that the cause is abnormality in the communication network N itself, the key acquisition disabled state may be determined only when communication with the other control device 1 can be performed. Each control device 1 may also transmit state notification for notifying its own status as described above to the other control device 1 or the key distribution server 9.

With the above configuration, the key distribution server 9 periodically notifies the control device 1 of the state of the server, and the control device 1 determines whether the encryption key K can be acquired (updated) from the key distribution server 9, based on state information of the key distribution server 9 notified from the key distribution server 9 or communication status of the state notification S periodically performed. Thus, it is possible to appropriately detect the key acquisition disabled state.

In the above description, the present invention has been described with reference to the case where encrypted communication is performed between the control devices 1. However, the present invention is not limited to this embodiment. In some embodiments, it can be applied to the case where the control device 1 performs encrypted communication with other devices such as the OPS 83 and the ACS 84 connected to the communication network N. This case will not be described here since the other control device 1 with which the control device 1 performs encrypted communication in the above description can be replaced with the devices such as the OPS 83 or the ACS 84.

Figure 3:
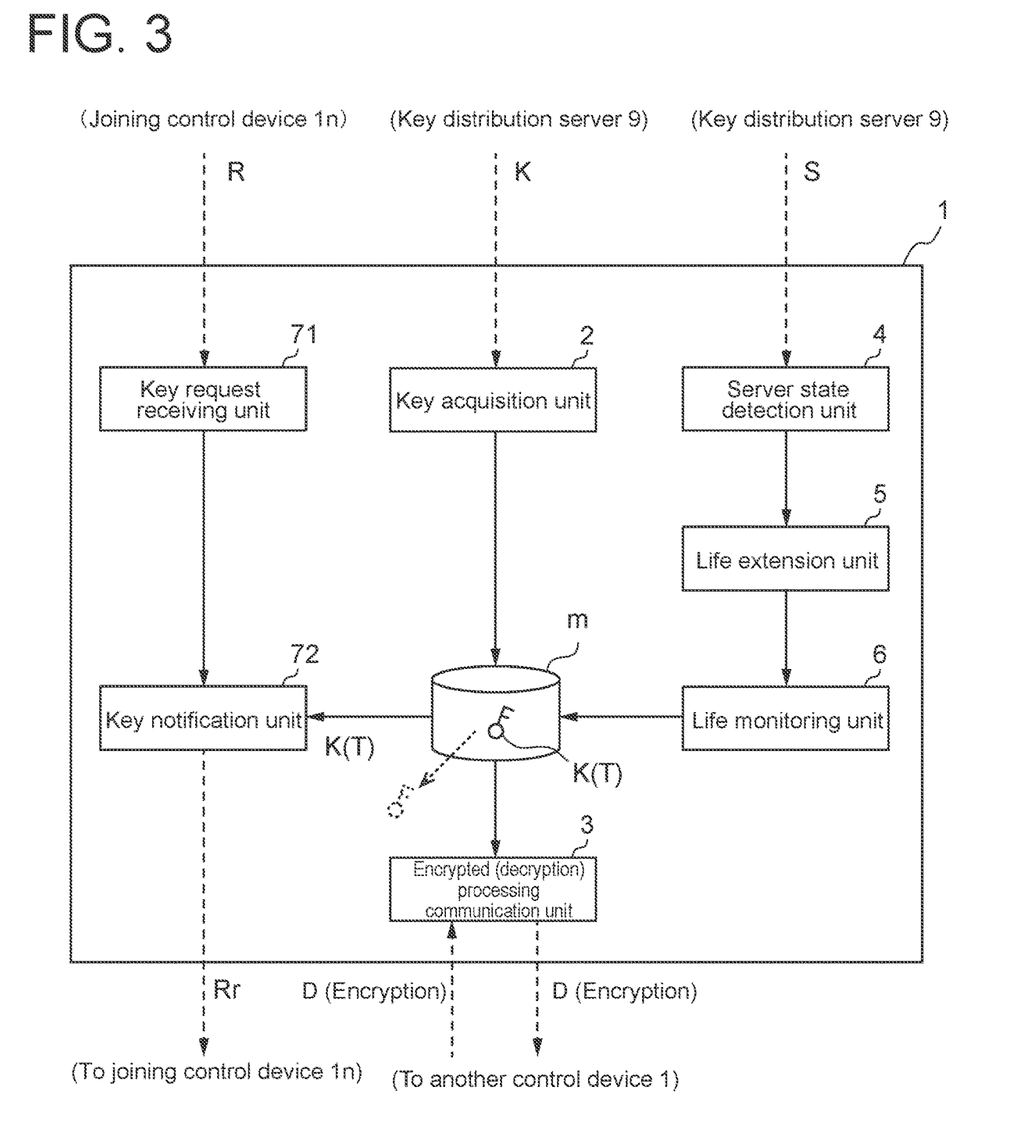
FIG. 3 is a schematic configuration block diagram of a control device including a key request receiving unit and a key notification unit according to an embodiment of the present invention.
Figure 4:
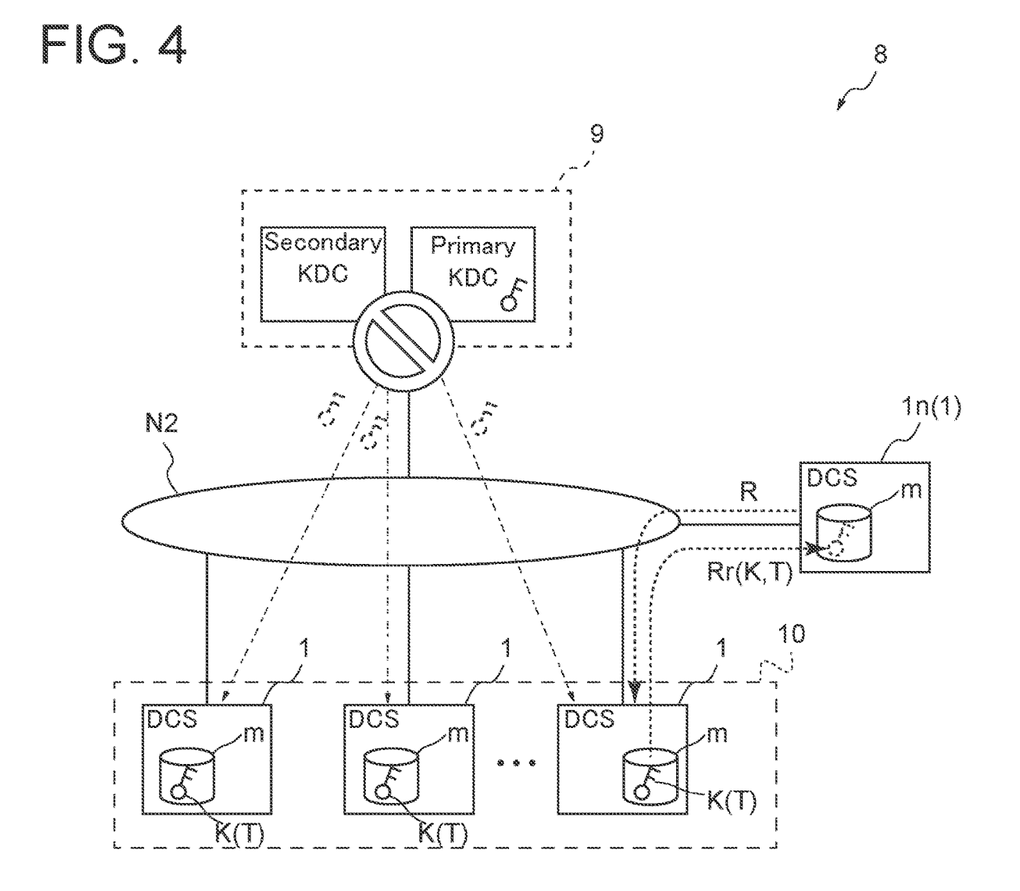
FIG. 4 is a diagram showing a simplified connection form between a distributed control device and a key distribution server according to an embodiment of the present invention, which corresponds to the connection form in the control information network of FIG. 1.
Figure 5:
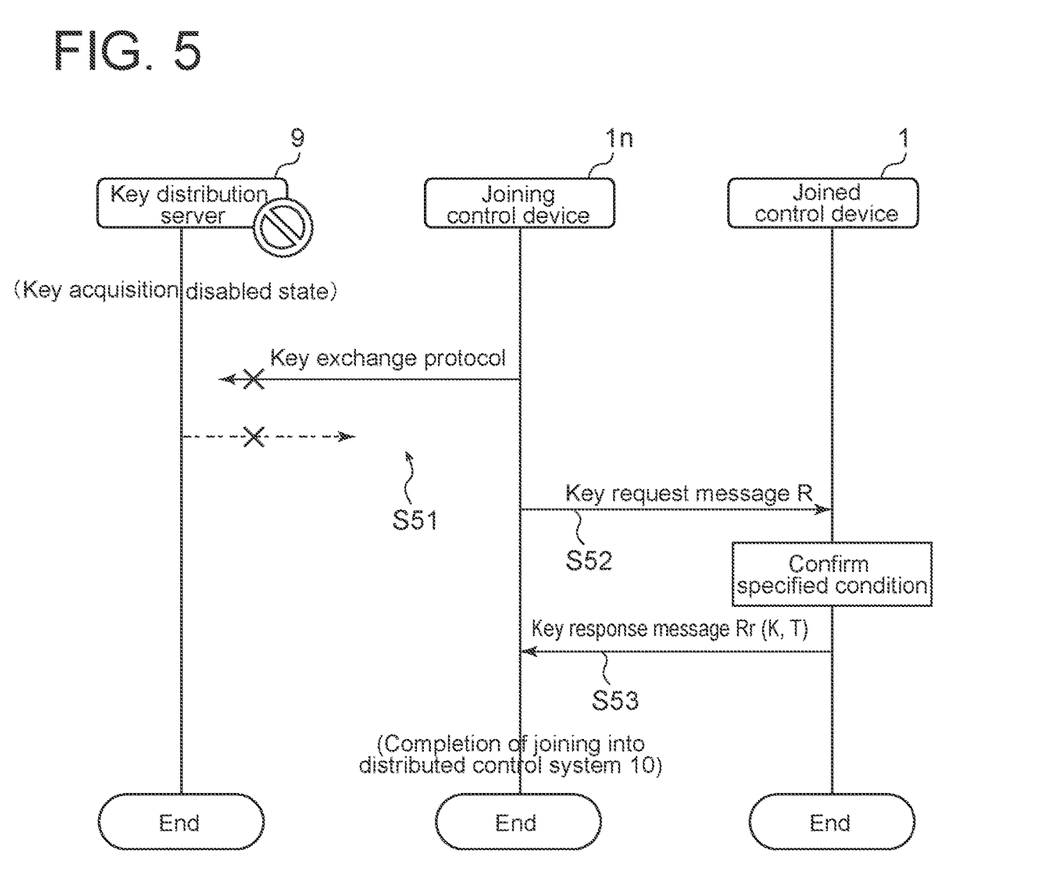
FIG. 5 is a sequence diagram when a joining control device joins a distributed control device according to an embodiment of the present invention.

Next, embodiments relating to other functional units that can be included in the control device 1 when the control device 1 constitutes the distributed control device 10, and the key distribution server 9 will be described with reference to FIGS. 3 to 5. FIG. 3 is a schematic configuration block diagram of the control device 1 including a key request receiving unit 71 and a key notification unit 72 according to an embodiment of the present invention. FIG. 4 is a diagram showing a simplified connection form between the distributed control device 10 and the key distribution server 9 according to an embodiment of the present invention, which corresponds to the connection form in the control information network N2 of FIG. 1. FIG. 5 is a sequence diagram when a joining control device 1n joins the distributed control device 10 according to an embodiment of the present invention.

In some embodiments, as shown in FIG. 3, the control device 1 may further include: a storage unit m (described above) configured to store the encryption key K and the life period T acquired by the key acquisition unit 2; a key request receiving unit 71 configured to receive a key request message R requesting the encryption key K and transmitted from a control device 1 (hereinafter, referred to as joining control device 1n) that intends to newly join the distributed control device 10; and a key notification unit 72 configured to transmit the encryption key K and the life period T stored in the storage unit m to the joining control device 1n that has transmitted the key request message R.

In the embodiments shown in FIGS. 3 to 5, as shown in FIGS. 4 and 5, after the joining control device 1n is connected to the control information network N2, a key exchange protocol starts between the joining control device 1n and the key distribution server 9 to join the distributed control device 10 (S51 of FIG. 5). However, for example, since the key distribution server 9 is down (key acquisition disabled state), the same session key K as used between the existing control devices 1 of the distributed control device 10 cannot be acquired from the key distribution server 9. In such a case, the joining control device 1n transmits a key request message R to at least one of the control devices 1 that have already joined the distributed control device 10 (S52 of FIG. 5). Specifically, the joining control device 1n may transmit the key request message R (IP packet) to a destination address (e.g., IP address) stored in advance in the storage unit m thereof. Alternatively, the joining control device 1n may transmit the key request message R by broadcasting, which may transmit the key request message R to the joined control device 1 belonging to the same broadcast domain.

Then, the joined control device 1 that has received the key request message R transmits a key response message Rr including the encryption key K and the life period T (S53 of FIG. 5). At this time, in some embodiments, the key notification unit 72 of the joined control device 1 transmits the encryption key K and the life period T to the joining control device 1n only when a specified condition is satisfied. The specified condition may include that the key acquisition disabled state is detected by the server state detection unit 4. In other words, the control device 1 transmits the encryption key K to the joining control device 1n if the key acquisition disabled state is detected. This prevents the control device 1 from transmitting the encryption key K, etc., to the joining control device 1n even though the key distribution server 9 can distribute the encryption key K. Thus, the joining control device 1n acquires the encryption key K and the life period T, so that the joining control device 1n enables encrypted communication with the other control devices 1 and joins to the distributed control device 10.

However, the present invention is not limited to the present embodiment. In some embodiments, the joining control device 1n may transmit the key request message R when the state notification S periodically transmitted by the key distribution server 9 is not received. In this case, information (e.g., IP address) on the joining control device 1n may be registered in advance in the key distribution server 9 as the distribution destination of the encryption key K.

With the above configuration, the control device 1 notifies the encryption key K instead of the key distribution server 9 in response to the request from the other control device 1 (joining control device 1n) that intends to newly join the distributed control device 10 to which the control device 1 belongs. Thus, even in the key acquisition disabled state due to the key distribution server 9 going down for example, the joining control device 1n can join the distributed control device 10.

Further, in some embodiments, as shown in FIG. 4, the key distribution server 9 may be redundant. In the embodiment shown in FIG. 4, the key distribution server is duplicated. Thus, it is possible to improve the reliability of the key distribution server 9. Further, when at least one device constituting the key distribution server 9 operates appropriately, the control device 1 (joining control device 1n) that intends to newly join the distributed control device 10 can join.

Figure 6:
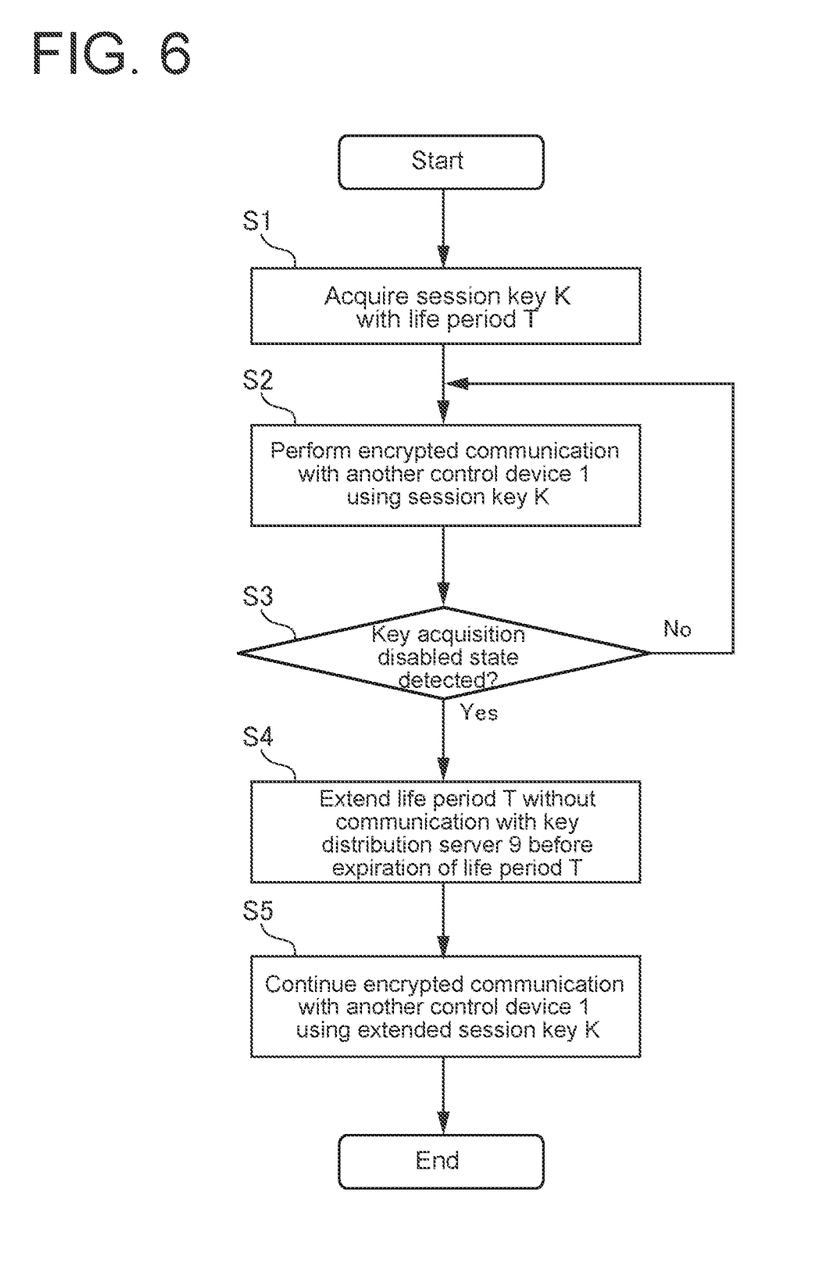
FIG. 6 is a diagram showing an encryption key life extension method according to an embodiment of the present invention.

Hereinafter, the encryption key life extension method corresponding to the process performed by the control device 1 will be described with reference to FIG. 6. FIG. 6 is a diagram showing the encryption key life extension method according to an embodiment of the present invention.

The encryption key life extension method is performed by the control device 1 which communicates with another device via the communication network N, such as the control device 1 of the distributed control device 10 in which a plurality of control devices 1 are connected via the communication network N. As shown in FIG. 6, the encryption key life extension method includes: a key acquisition step of acquiring, from the key distribution server 9 via the communication network N, the encryption key K with the life period T; an encrypted communication step of performing encrypted communication with another device (e.g., another control device 1) using the encryption key K within the life period T; a server state detection step of detecting the key acquisition disabled state where acquisition of the encryption key by the key acquisition step is disabled; and a life extension step of performing extension processing for extending the life period T if the key acquisition disabled state is detected. The key acquisition step, the encrypted communication step, the server state detection step, and the life extension step are the same as the processes performed by the key acquisition unit 2, the encrypted communication processing unit 3, the server state detection unit 4, and the life extension unit 5, respectively, and the details will be omitted.

In the embodiment shown in FIG. 6, the key acquisition step is performed in step S1 to acquire the session key K (life period T and encryption key K). In step S2, the encrypted communication is performed. Specifically, encrypted communication with another device is performed using the session key K acquired in step S1. Then, when the session key K used in step S2 is valid, the server state detection step is performed in step S3. As a result, if the key acquisition disabled state is detected, in step S4, the extension processing is performed at any time before the expiration of the life period T. It may be immediately after the detection of the key acquisition disabled state, or may be before the expiration of the life period T. Conversely, in step S3, if the key acquisition disabled state is not detected, in step S5, the encrypted communication with the other device continues (is performed) using the session key K after the extension processing.

If the key distribution server 9 is restored and becomes able to distribute the session key K during the execution of step S5, the encrypted communication is performed using the session key K distributed after the restoration.

The present invention is not limited to the embodiments described above, but includes modifications to the embodiments described above, and embodiments composed of combinations of those embodiments.

REFERENCE SIGNS LIST

10 Distributed control device
1 Control device
1n Joining control device
m Storage unit
2 Key acquisition unit
3 Encrypted communication processing unit
4 Server state detection unit
5 Life extension unit
6 Life monitoring unit
71 Key request receiving unit
72 Key notification unit
8 Industrial control system
81 Field device
82 IOM
83 OPS
84 ACS
85 Firewall device
9 Key distribution server
N Communication network
N1 Control network
N2 Control information network
N3 Another network
K Encryption key (Session key)
T Life period
S State notification
D Communication data
R Key request message
Rr Key response message

The invention claimed is:

1. A control device configured to communicate with another device via a communication network, the control device comprising:
a memory configured to store a program; and
a processor configured to execute the program and control the control device to:
acquire, from a key distribution server via the communication network, an encryption key with a life period for performing encrypted communication with the another device;
perform the encrypted communication with the another device using the encryption key within the life period;
detect a key acquisition disabled state where acquisition of the encryption key is disabled; and
perform extension processing for extending the life period if the key acquisition disabled state is detected.

2. The control device according to claim 1, wherein the processor is further configured to execute the program and control the control device to determine expiration of the life period,
wherein the extension processing prevents the determination of expiration of the life period as the extension processing.

3. The control device according to claim 2,
wherein the processor is further configured to execute the program and control the control device to count the life period, and
wherein the extension processing puts back a count value of the life period for the determination of the expiration by a predetermined value.

4. The control device according to claim 1,
wherein the processor is further configured to execute the program and control the control device to detect the key acquisition disabled state, based on state notification periodically transmitted from the key distribution server or communication status of the state notification.

5. The control device according to claim 1,
wherein the control device is a device constituting a distributed control device, and
wherein the processor is further configured to execute the program and control the control device
to store the encryption key and the life period acquired;
to receive a key request message transmitted from a joining control device that intends to newly join the distributed control device, the key request message requesting the encryption key; and
to transmit the encryption key and the life period stored to the joining control device that has transmitted the key request message.

6. The control device according to claim 5,
wherein the processor is further configured to execute the program and control the control device to transmit the encryption key and the life period to the joining control device if a specified condition including that the key acquisition disabled state is detected is satisfied.

7. The control device according to claim 1,
wherein the encryption key is a session key.

8. An industrial control system, comprising:
the control device according to claim 1; and
a key distribution server configured to distribute an encryption key with a life period shared between the control device and another device to the control device and the another device.

9. The industrial control system according to claim 8,
wherein the key distribution server is redundant.

10. An encryption key life extension method performed by a control device configured to communication with another device via a communication network, the method comprising:
a key acquisition step of acquiring, from a key distribution server via the communication network, an encryption key with a life period for performing encrypted communication with the another device;
an encrypted communication step of performing the encrypted communication with the another device using the encryption key within the life period;
a server state detection step of detecting a key acquisition disabled state where acquisition of the encryption key by the key acquisition step is disabled; and
a life extension step of performing extension processing for extending the life period if the key acquisition disabled state is detected.

* * * * *